United States Patent [19]
Laspesa

[11] 3,894,232
[45] July 8, 1975

[54] ROTATIONALLY ADJUSTABLE SUPPORT MECHANISM

[75] Inventor: Richard E. Laspesa, Chicago, Ill.

[73] Assignee: Teletype Corporation, Skokie, Ill.

[22] Filed: May 8, 1974

[21] Appl. No.: 468,049

[52] U.S. Cl............ 250/231 SE; 250/234; 74/89.15
[51] Int. Cl. ............................................. G01p 3/36
[58] Field of Search...... 250/233, 234, 231 SE, 215; 310/66, 67, 68; 74/89.15; 324/175; 192/DIG.1

[56] References Cited
UNITED STATES PATENTS

| | | | |
|---|---|---|---|
| 3,307,041 | 2/1967 | Kling | 250/229 X |
| 3,693,023 | 9/1972 | Wasserman | 250/231 SE |
| 3,719,005 | 3/1973 | Carli | 74/89.15 |

*Primary Examiner*—Walter Stolwein
*Attorney, Agent, or Firm*—K. R. Bergum; J. D. Kaufmann; J. L. Landis

[57] ABSTRACT

A rotationally adjustable support mechanism, which is particularly adapted for mounting on a motor housing, allows a first supported part (e.g., a sensor) to be accurately adjusted angularly relative to a second part (e.g., a shaft mounted code wheel). A specially constructed and uniquely mounted semi-circular bushing allows the mechanism (together with the first part supported thereon) to be readily mounted on or removed from the motor housing without requiring the removal of the shaft mounted second part and/or any other associated apparatus.

10 Claims, 5 Drawing Figures

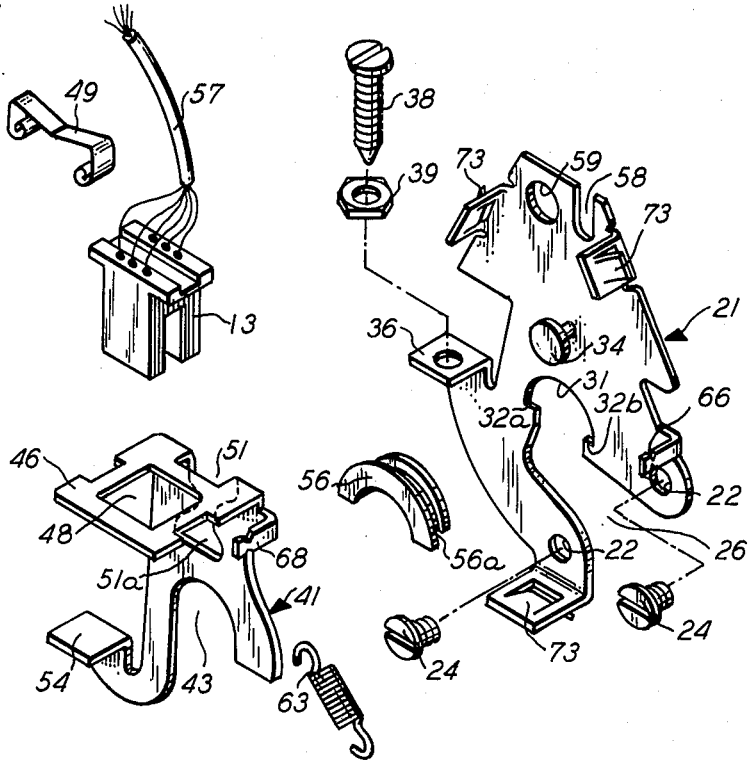
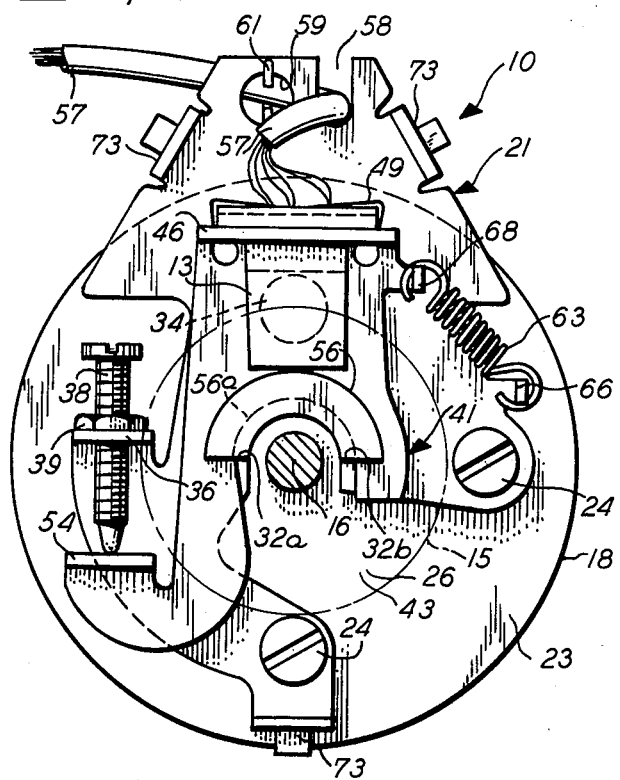
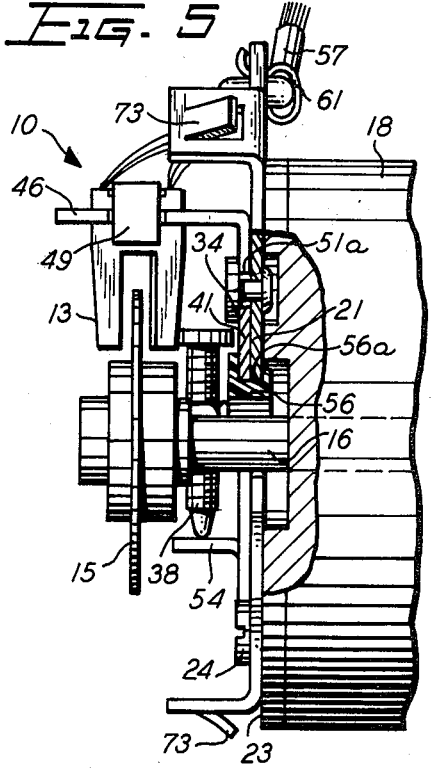

3,894,232

ROTATIONALLY ADJUSTABLE SUPPORT MECHANISM

BACKGROUND OF THE INVENTION

1. Field Of The Invention

This invention relates to rotational adjustment apparatus and, more particularly, to such apparatus for supporting and angularly positioning a first part relative to a shaft driven rotatable second part.

2. Description Of The Prior Art

Rotationally adjustable support apparatus heretofore has often simply comprised a pivotally mounted support member, often in the form of a circular plate, with an oversized lock screw fastening hole (or slot) formed therein on a side opposite, or at least removed from, a pivot point so as to allow a slight arcuate displacement of the support member. In this manner, a piece part mounted on the support member may be pivotally oriented relative to another associated rotatable part mounted, for example, on the drive shaft of a motor. Unfortunately, such a pivotally adjustable member necessarily swings in an arc about the pivot point, rather than in a true rotational manner about a fixed axial center. Accordingly, precise angular rotation of a part mounted on such a pivotal member is not possible.

While a pair of mutually disposed arcuate slots formed in such a support member, for example, may allow a limited degree of true angular rotation thereof, multiple adjustment slots often present other problems, such as in making finely graduated angular adjustments, and/or in holding such a support member firmly in the desired adjusted position while two or more required lock screws or similar fastening members are turned down or otherwise actuated to secure the member rigidly to associated frame structure.

The ease with which precise angular adjustments of one part relative to another can be made is of particular importance with respect to normally fixed position parts, such as sensors (or transducers) which must be accurately oriented angularly with respect to an associated shaft driven part, such as a code wheel. Such apparatus is often employed in very demanding electronic systems applications requiring, for example, the generation of pulse trains for logic timing, encoding, decoding, sensing, comparing and control purposes.

In such applications, the adjustable support structure heretofore has often been mounted on the motor frame so as to surround the drive shaft and, thereby, allow the angularly adjustable sensor, in whatever form, to be positioned very close to the code wheel. When mounted in this manner, however, the adjustable sensor support structure cannot thereafter be readily removed with the sensor as a unit from the shaft in order to facilitate the replacement or servicing of the sensor, for example, without first necessitating the removal of the code wheel and any other shaft mounted structure associated therewith.

SUMMARY OF THE INVENTION

It, therefore, is an object of the present invention to provide a new and improved rotationally adjustable support mechanism which may not only angularly adjust a supported part precisely and in a simple, reliable manner relative to a shaft driven part, for example, but be easily mounted on and removed from fixed support structure in a manner that does not affect associated shaft mounted apparatus.

In accordance with one preferred embodiment of the invention, the rotationally adjustable support mechanism is employed in one illustrative application to angularly position an optical sensor relative to a code wheel mounted on and driven by the shaft of a stepping motor employed in one particular matrix printer. The mechanism includes a base plate adapted for mounting on the shaft end of the motor housing, and an adjustable sensor support member rotatably coupled to the base plate. Both the base plate and support member have major planar surface areas, each having a semi-circular opening formed in a central region thereof. Each such opening communicates with an outer edge of the base plate and support member respectively so as to allow them to be positioned in a non-contacting, but partially concentric manner with respect to the motor shaft.

Such positioning of the support mechanism is made possible, in part, through the use of a uniquely constructed bushing that has an outer, arcuate, U-shaped channel. The bushing is supported and oriented within the semi-circular opening in the base plate in such a manner that the outer channel thereof not only confines coextensive, arcuate portions of the juxtaposed base plate and adjustable member surrounding the semi-circular openings therein, but supports the latter for rotational displacement on the bushing. In this manner, accurate and reliable angular adjustment of the support member relative to both the base plate and motor shaft is always assured, as the member rotates about the bushing, which has an axis of rotation that coincides with the axis of the motor shaft. Rotational biasing means and an adjustable threaded member are employed, in combination, to both adjust and, thereafter, maintain the adjustable support member at the desired angular orientation relative to the base plate and more particularly. to associated apparatus mounted on the motor shaft.

Such a rotatably adjustable support mechanism provides a simple and reliable means for angularly adjusting, in a precise manner, a first part relative to a shaft mounted part, and without disturbing the latter either during an adjustment operation, or during the mounting or removal of the first part with or without the support mechanism from the shaft driven part.

BRIEF DESCRIPTION OF THE DRAWINGS

FIG. 2 is an enlarged, exploded perspective view of the adjustable support mechanism of FIG. 1;

FIGS. 3 and 4 are enlarged, front elevational views of the rotationally adjustable support mechanism, respectively illustrating two different angularly displaced positions of a sensor mounted thereon; and FIG. 5 is an enlarged, side elevational view of the assembled support mechanism corresponding to the position thereof depicted from the front in FIG. 3.

DETAILED DESCRIPTION OF THE INVENTION

Figure 1:
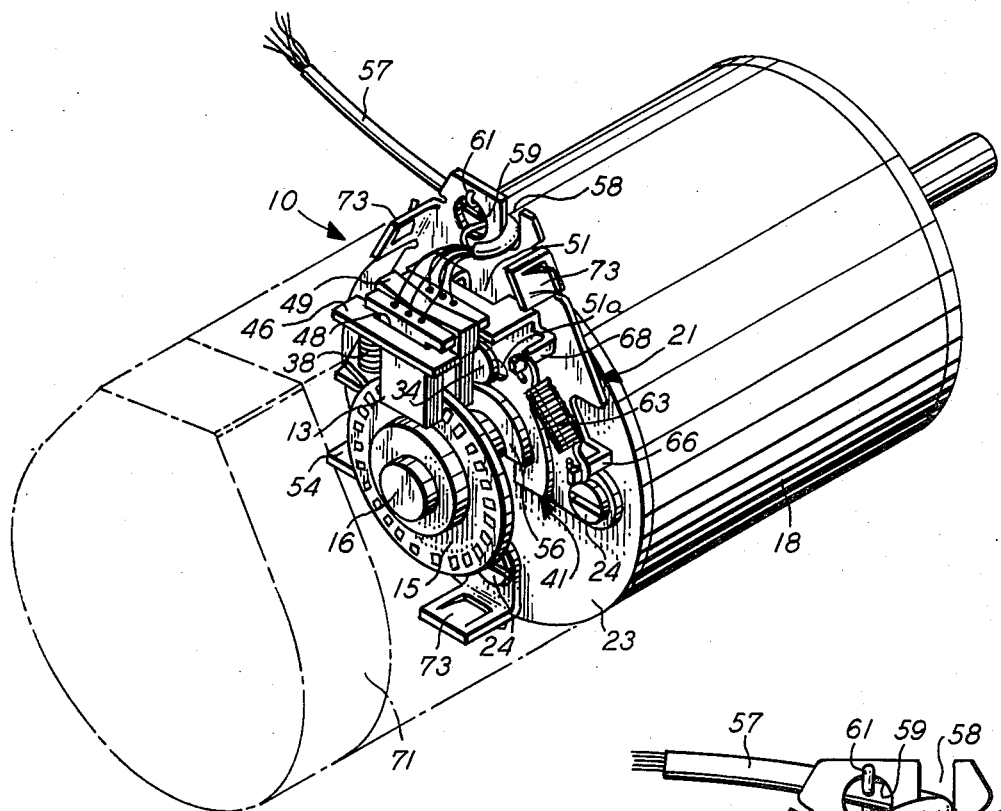
FIG. 1 is a front elevational view of an illustrative rotationally adjustable support mechanism embodying the principles of the present invention, and is disclosed in a typical shaft position sensing application involving a sensor supported thereby, together with a stepping motor and shaft driven encoder.

As previously mentioned, the rotationally adjustable support mechanism 10 embodied herein has universal application, but for purposes of illustration herein, it is disclosed in FIG. 1 in connection with the mounting and angular positioning of a photo-electric sensor 13 associated with a code wheel or encoder 15 mounted on a shaft 16 of a stepping motor 18. Such a sensor-code wheel combination has particular application, for example, in generating a timing pulse train which synchronizes the speed (or angular position) of the motor shaft relative to associated logic control circuitry of a printer. Such shaft position-representative timing pulses may also be utilized, for example, for comparison with a reference pulse train, or for counting the number of pulses produced within a specified time period, with the net result of such a comparison or counting process being used to generate a control signal which is in some way proportional to or representative of a deviation, if any, from some predetermined norm or standard. Such a control signal may then, in turn, be used in a servo or feedback loop to control motor speed, or to synchronize or initiate the actuation of associated mechanical or electromechanical apparatus, such as the print hammers in a printer.

In any event, the rotationally adjustable mechanism 10 as embodied herein includes, as best seen in FIGS. 2 and 3, a base plate 21 having a major planar surface area with at least two holes 22 formed therein which allow the securement thereof to a shaft end plate 23 of the housing of the motor 18, for example, by any suitable fastening means 24, such as the screws depicted. The base plate 21 has a cut-away area 26 which merges into a substantially semi-circular opening 31 formed in a central region of the base plate, with the opening surmounting two shoulders 32a and b. The cut-away area 26 is of a width, and the opening is of a diameter, sufficient to allow the base plate to be positioned partially around, but in non-contacting relationship with, the motor shaft 16. A combination pivot stop and fastening member 34, such as in the form of a flat head screw, is secured within a tapped hole formed in the base plate 21 a short distance above and centered relative to the semi-circular opening 31, and will be described in greater detail hereinafter.

The base plate 21 is also formed with an integral, outwardly extending tab 36 which has a tapped hole formed therein to accommodate a threaded member 38. The function of the member 38, together with a locking nut 39, will also be described further hereinafter in connection with the assembly and adjustment of the composite mechanism 10.

A rotationally adjustable support member 41 is also formed with a major planar surface area that is in slideable contact with the base plate as assembled. The member 41 is formed with a semi-circular opening 43 which is of the same diameter as the opening 31 formed in the base plate 21, as defined between the inner corners of the shoulders 32a and b of the latter.

The adjustable member 41, as best seen in FIG. 2, is formed with an integral, outwardly extending upper support ledge or platform 46 which, for the application illustrated, has an aperture 48 formed therein to receive the photosensor 13. A resilient snap-on spring 49 is employed to firmly hold the sensor within the aperture of the platform 46. The adjustable member 41 also has a cutaway portion 51 formed therein which terminates in a base slot 51a that freely receives the shank portion of the combination pivot stop and fastening screw 34 that extends therethrough when the mechanism is assembled as best seen in FIG. 3. An outwardly extending tab 54 is formed as an integral part of the adjustable support member 41, and is located so as to normally underlie the tab 36 similarly formed in the base plate 21. The significance of these tabs will be described in greater detail hereinbelow.

In accordance with the principles of the present invention, the member 41 is supported for partial rotational movement relative to the base plate 21 (and motor shaft 16) by means of a unique semi-circular bushing 56, preferably made of a plastic material such as nylon, which exhibits a limited degree of resiliency. The bushing 56 is formed with an outer U-shaped channel 56a (best seen in FIG. 2), and is dimensioned so as to allow the force-fit mounting thereof between the locking shoulders 32a and b which surmount the semi-circular opening 31 in the base plate 21.

With the bushing 56 thus constructed and mounted, it is seen that the U-shaped channel 56a thereof confines, in mating relationship therewithin, coextensive arcuate portions of the base plate 21 and adjustable support member 41. As such, the U-shaped channel 56a of the bushing not only functions as a retainer, but the base thereof functions as the bearing surface that allows the arcuate angular adjustment of the support member 41 relative to the motor shaft 16 (and code wheel) about a common axis of rotation.

In connection with the coupling of the adjustable member 41 to the base plate 21, the flat head of the pivot stop and fastening screw 34, is employed to bias against and assist in maintaining the base plate 21 and member 41 in slideable contact with each other. However, in many applications, a headed screw 34 need not even be employed as a pivot stop and fastener. Rather, the headed screw 34 may be replaced by a simple, outwardly extending tab or pivot detent formed in the base plate 21. The formation of such a tab would, of course, depend in part on the nature and gauge of the metal employed for the base plate, and would be located so as to extend throuogh the slot 51a in the adjustable member in the same manner as for the screw 34. As such, the tab, as in the case with the screw, would limit relative angular displacement between the base plate and adjustable member within an arc that can be tolerated by the semi-circular bushing.

In order to facilitate the lead-out of a cable 57 from the sensor 13 to external circuitry (not shown), the base plate has a notch 58 formed in the upper edge thereof. An aperture 59 is formed adjacent to the notch 58, and accommodates a resilient cable clamp 61 that maintains the lead-out portion of the cable anchored firmly against the back side of the support plate 21.

Figure 4:
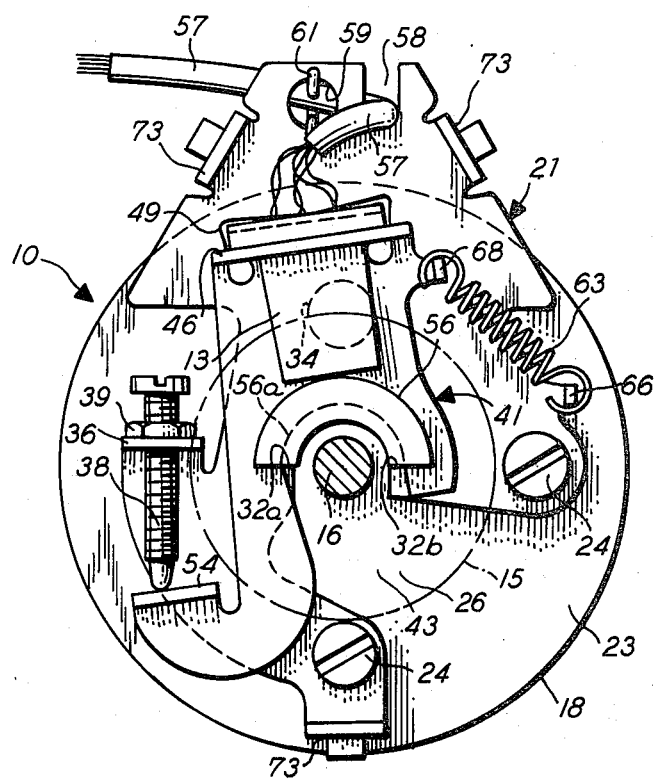

Only after the composite mechanism 10 has been assembled and secured to the outer housing end plate 23, by means of the screws 24, with the sensor 13 mounted thereon, would a final angular adjustment of the support member 41 be made relative to the code wheel (and motor shaft 16). Such a final adjustment is readily accomplished by the use of the threaded adjustment screw 38, in combination with a biasing coil spring 63 (see FIGS. 3 and 4). More specifically, the spring 63 is preferably connected under spring tension between an outwardly extending tab or post 66, formed as an integral part of the base plate 21, and a similar post 68, formed as an integral part of the adjustment support member 41. As viewed in FIG. 3, the spring posts are located relative to each other so that the spring 63 continuously exerts a clockwise rotational biasing force on the adjustable support member 41, relative to the stationary base plate 21. As a result, the tab 54 of the adjustable support member 41 is continuously urged towards the stationary tab 36 of the base plate, as viewed in FIGS. 3 and 4.

As thus spring biased, the desired angular orientation of the adjustable member 41 is effected by either advancing or retracting the threaded member 38 within the tapped hole formed in the tab 36 until the free end of the screw biases the tab 54 into the proper spatial relationship relative to the tab 36. This adjustment, of course, directly controls the degree of relative angular displacement effected between the base plate 21 and the adjustable member 41. When the desired angular orientation of the support member 41 is established, the locking nut 39 may be employed to securely hold the adjustment screw 38 in the desired position in the tab 36.

Advantageously, angular adjustment of the support plate 41 always takes place about a bushing-defined axis that is common with the axis of the motor shaft 16. This, of course, assures accurate rotational displacement of the sensor 13 relative to the code wheel in the illustrative application considered herein. As such a common axis of rotation is accomplished with the support mechanism 10 being mounted in only a partially concentric relationship with the motor shaft 16, the mechanism may advantageously be removed from the motor housing without in any way disturbing or requiring the removal of associated shaft mounted apparatus, such as the illustrated code wheel 15 and mounting therefor.

In order to protect the sensor 13 and code wheel 15 from dust and any other foreign matter, the base plate 21 is adapted to support a dust cover 71, depicted in FIG. 1. This is accomplished by forming three spaced resilient fastening detents 73 about peripheral edges of and as an integral part of the base plate. These detents extend outwardly a short distance so as to frictionally engage the inner side wall of the dust cover, which preferably is made of a suitable opaque or translucent plastic material.

In view of the foregoing, it is obvious that various modifications may be made to the present invention by one skilled in the art, and that a number of alternatives may be provided without departing from the spirit and scope of the present invention. For example, it should be appreciated that the adjustment screw 38 may be threadedly secured within a tapped hole of either tab 36 or 54, or alternatively, within a separate internally threaded eyelet secured within an aperture formed in either tab.

It should also be appreciated that the ledge or support platform 46 of the adjustable member 41 may be dimensioned and apertured (or slotted) so as to accommodate any one of a number of different types of parts or elements requiring precise, angular orientation relative to an associated rotatable part, whether the latter is a motor shaft mounted code wheel or not. To that end, the unique rotatably adjustable mechanism 10 disclosed and claimed herein advantageously has universal application.

What is claimed is:

1. A rotationally adjustable support mechanism comprising:

a first member mountable on a fixed frame and having a major planar region with a semicircular opening formed in a central area thereof, said opening surmounting two shoulders;

a second piece-part supporting member having a major planar region with a semi-circular opening formed in a central area thereof, the openings in said first and second members being dimensioned such that the arcuate edges thereof when aligned and juxtaposed are substantially coextensive between said shoulders of said first member;

semi-circular bushing mounted within said opening of said first member and locked between said shoulders thereof, said bushing being formed with an outer U-shaped channel, the side walls of which confine is slideable contact therebetween arcuate portions of said first and second members adjacent the respective openings therein; and adjusting means coupled between said first member and said second member for rotating the latter relative to the former about said bushing to establish, and then maintain a desired angular position of said second member, and any piece part when supported thereon, relative to said first member.

2. A rotationally adjustable support mechanism in accordance with claim 1 wherein said adjusting means comprises an outwardly extending tab formed on each of said first and second members, both tabs being positioned so as to be in overlying and spaced relationship with respect to each other, at least one of said tabs including a threaded opening for receiving a threaded member;

a threaded member secured within the threaded opening of one of said tabs and being adjusted so that a free inner end thereof is biased against an adjacent surface of the other of said tabs to thereby control the spacing between said tabs and, in turn, the angular position of said second member relative to said first member; and biasing means for continuously urging said tabs towards each other, thereby maintaining said inner free end of said threaded member in continuous contact with said other tab.

3. A rotationally adjustable support mechanism in accordance with claim 2 wherein said first member has a protuberance extending outwardly from one side thereof spaced above and centered with respect to the semi-circular opening formed therein, and wherein said second member has a slot formed therein and located so as to receive said protuberance, opposite ends of said slot providing rotational stops which limit the degree of rotational displacement of said second member relative to said first member.

4. An assembly for supporting and rotationally adjusting the position of a normally stationary part relative to an associated shaft driven part, said assembly comprising:

a base plate securable to a stationary frame, and having a centrally located semi-circular opening which surmounts two shoulders formed therein, and further having a tab formed therein, said tab being spaced to one side of said opening and extending outwardly from one side surface of said base plate;

an angularly adjustable member having a piece part supporting ledge formed as an integral part thereof, and having a major planar region with a semi-circular opening formed in a central area thereof, the openings in said adjustable member and base plate being dimensioned such that the arcuate edges thereof when aligned and juxtaposed, are substantially coextensive between the shoulders of said base plate, said adjustable member further having a tab formed therein, said tab being spaced to one side of the opening therein and extending outwardly from one side surface thereof so as to be in overlying and spaced relationship with respect to said tab of said base plate;

a semi-circular bushing formed with an outer arcuate, U-shaped channel, said bushing being force-fit between said shoulders surmounted by the opening in said base plate, the walls of said channel confining in slideable contact therebetween arcuate portions of said base plate and rotatable member adjacent the respective openings therein, and means for adjusting the spacing between said tabs, and to thereby control the angular displacement of said adjustable member, and an associated part when supported thereon, relative to both said base plate and any associated and adjacent shaft driven part.

5. An assembly in accordance with claim 4 wherein said base plate further includes an outwardly extending protuberance spaced from but centered above said semi-circular opening therein, and wherein said adjustable member has an oversized slot formed therein which is positioned above said opening to receive said base plate protuberance and, thereby, restrict the angular displacement of said adjustable member relative to said base plate.

6. An assembly in accordance with claim 5, wherein said bushing is made of plastic, and wherein said means for adjusting includes a threaded member extending through a tapped hole formed in the tab of said base plate, and further including a biasing spring connected between said base plate and adjustable member so as to continuously maintain the inner free end of said threaded member biased against the tab of said adjustable member.

7. An assembly in accordance with claim 6 wherein said protuberance comprises a threaded member secured within a threaded hole in said base plate, and having a head portion which slideably biases against the side of said adjustable member opposite said base plate.

8. An assembly in accordance with claim 7 wherein said spring is secured at one end to an integral tab formed in the base plate and at the other end to an integral tab formed in the adjustable member, and wherein said base plate and adjustable member each has a cutaway portion extending and tapering outwardly from the associated semicircular opening therein to an outer edge thereof so as to allow the bushing mounted on said base plate to be positioned in a partially concentric, non-contacting manner relative to a rotatable shaft.

9. In a shaft position sensing assembly wherein an adjustable sensor is positioned adjacent a motor shaft-mounted and driven encoder, the combination further comprising:

a rotationally adjustable support mechanism, said mechanism including:

a base plate securable to a shaft end of the housing of the motor, and having a centrally located semi-circular opening which surmounts two shoulders formed therein, and further having a tab formed therein, said tab being spaced to one side of said opening and extending outwardly from one side surface of said base plate;

an angularly adjustable member having a sensor supporting ledge formed as an integral part thereof, and having a major planar region with a semi-circular opening formed in a central area thereof, the openings in said adjustable member and base plate being dimensioned such that the arcuate edges thereof when aligned and juxtaposed, are substantially coextensive between the shoulders of said base plate, said adjustable member further having a tab formed therein, said tab being spaced to one side of the opening therein and extending outwardly from one side surface thereof so as to be in overlying and spaced relationship with respect to said tab of said base plate; and means for adjusting the spacing between said tabs, to thereby control the angular displacement of said adjustable member, together with said sensor supported thereon, relative to both said base plate and adjacent shaft driven encoder, said adjusting means including a threaded member extending through a tapped hole formed in one of said tabs, and further including a biasing spring connected between said base plate and adjustable member so as to continuously maintain the inner free end of said threaded member biased against the other of said tabs.

10. In a shaft position sensing assembly in accordance with claim 9, said base plate further including an outwardly extending protuberance spaced from but centered above said semi-circular opening therein, and said adjustable member further including an oversized slot formed therein which is positioned above said opening to receive said base plate protuberance and, thereby, restrict the angular displacement of said adjustable member relative to said base plate, and said base plate and adjustable member further being characterized by each having a cutaway portion extending and tapering outwardly from the associated semi-circular opening therein to an outer edge thereof so as to allow the bushing mounted on said base plate to be positioned in a partially concentric, non-contacting manner relative to the motor shaft.

* * * * *